United States Patent [19]

Hocker et al.

[11] Patent Number: 5,561,758
[45] Date of Patent: Oct. 1, 1996

[54] TUNNEL ICON

[75] Inventors: Michael D. Hocker, Staatsburg, N.Y.; Daniel J. Winarski, Tucson, Ariz.

[73] Assignee: International Business Machines Corporation, Armonk, N.Y.

[21] Appl. No.: 296,199

[22] Filed: Aug. 25, 1994

[51] Int. Cl.$^6$ ........................................................ G06F 3/14
[52] U.S. Cl. ................................................................ 395/159
[58] Field of Search ................................... 395/155, 157, 395/158, 159, 160, 161, 600, 800, 54

[56] References Cited

U.S. PATENT DOCUMENTS

| | | | |
|---|---|---|---|
| 5,060,135 | 10/1991 | Levine et al. | 395/155 |
| 5,313,575 | 5/1994 | Beethe | 395/159 |
| 5,363,482 | 11/1994 | Victor et al. | 395/157 |
| 5,379,366 | 1/1995 | Noyes | 395/54 |
| 5,418,950 | 5/1995 | Li et al. | 395/600 |

OTHER PUBLICATIONS

Gunn, W. A., "Free Space Cursor/Pointer Movement Device," Mar. 1990, IBM Technical Disclosure Bulletin, vol. 32, No. 10B, pp. 231–234.

Kerr, L. L., "Anti-Aliasing Border of Icons," Aug. 1990, IBM Technical Disclosure Bulletin, vol. 33, No. 3A, p. 205.

Gould, E. L., et al., "Three-Dimensional Menu Icons to Aid Users in Understanding Hierarchy," May 1991, IBM Tech. Disclosure Bulletin, vol. 33, No. 12, pp. 464–465.

O'Hara, J. P. M., "Pressure-Sensitive Icons," Jun. 1990, IBM Technical Disclosure Bulletin, vol. 33, No. 18, pp. 277–278.

Torres, R. J., "Dynamic Icons for Information Visualization," Aug. 1991, Research Disclosure, No. 328.

McLean, J. G., et al., "Mouse Ball-Actuating Device with Force and Tactile Feedback," Feb. 1990, IBM Technical Disclosure Bulletin vol. 32, No. 98, pp. 230–235.

Blalock, J. R., et al., "Pressure-Sensitive Mouse," Nov. 1992, IBM Technical Disclosure Bulletin, vol. 35, No. 6, pp. 288–289.

*Primary Examiner*—Mark R. Powell
*Assistant Examiner*—Ruay Lian Ho
*Attorney, Agent, or Firm*—Lynn L. Augspurger; Laurence J. Marhoefer

[57] ABSTRACT

A process icon based on a tunnel concept in which the icon has an input and an output portal through which an object is dragged in order to invoke the process. The direction of the process invoked (e.g., encrypt to decrypt or decrypt to encrypt) can be denoted and determined by the portal through which the object is dragged.

7 Claims, 5 Drawing Sheets

TUNNEL ICON

BACKGROUND OF THE INVENTION

1. Field of the Invention

This invention relates to an improved graphical user interface to allow a user to input operational commands to a computer and manipulate the position of images on a display screen. More particularly, it relates to an improved graphical user interface in which an icon representing an object is dragged through an icon representing a process in order to cause the computer to execute the process function on the object.

2. Description of the Prior Art

Graphical user interfaces, which allow a user to manipulate the position of icons on a computer display screen in order to input conventional commands to the system, are well known in the art. For example, the IBM OS/2 Workplace Shell Desktop Motif provides such icon manipulation. There, as an example of one operation, a user can delete a document by dragging the document icon across the screen and dropping it on a shredder icon displayed on the screen. Copending application Ser. No. 07/880,822, filed May 11, 1992, (attorney's docket number AT9-92-008) entitled "Icon Information System" and assigned to the assignee of this application, and which is incorporated herein by reference, discloses a method, system and program for transforming one or more icons in an object-oriented, graphical environment. As taught in this copending application, a user, using a drag and drop manipulation, moves an icon representing an object onto an icon representing the process. The graphical user interface program removes the object icon from the display and a new icon with changed contents and/or attributes in accordance with the function performed by the process represented by the process icon.

While generally satisfactory, process capable icons in use today are somewhat limited in the scope or complexity of the process which can be called for. That is, the process icon activates a process that always performs the same function or alternatively, employs a pop-up menu or other means for the user to specify additional process commands (e.g., process direction). Then, too, with the process-capable icons in use today, the dragged object is dropped in the receptive area of the process capable icon in order to invoke the process represented by the icon. If the process results in an output object, then the user must reacquire the object to drag it to another location and in any case must abandon the object while it is being processed.

SUMMARY OF THE INVENTION

An object of this invention is the provision of a process icon that provides the user both with a greater degree of process options that may be invoked while at the same time providing a high degree of intuitive feedback to the user in invoking the process.

Briefly, this invention contemplates the provision of a process icon based on a tunnel concept in which the icon has an input and an output portal through which an object is dragged in order to invoke the process. The direction of the process invoked (e.g., encrypt to decrypt or decrypt to encrypt) can be denoted and determined by the portal through which the object is dragged.

In its simplest form, representing a non-degenerate process, the tunnel icon has a single input portal and a single output portal. Tunnel icons with single input and multiple outputs and multiple inputs and multiple inputs are also disclosed. The single input multiple output tunnel icon can be used to invoke one or more alternative or concurrent processes on the input object. For example, in mailing a memorandum to a mailing list or converting bidirectionally between decimal hexidecimal and octal numbers.

A multiple input multiple output tunnel icon can be used to logically link objects in a joining and/or forking process; that is, the tunnel icon would not invoke the process until all inputs were individually dragged to their respective input portals. Each input can be held at an entrance portal until all are present.

In general, a process capable tunnel icon would have its portal visibly denoted. A visual indication of a "closed" portal can infer to the user that the portal is not usable (for whatever reason), thus saving the user from attempting a process which is not accessible. Advantageously, the portals can stretch to encompass a dragged object or alternatively the dragged object can shrink to fit the portal. Additional visual help for the user could include translucent tunnel icons and/or expansion of the icon to allow better visualization of the dragged object as it passes through the tunnel icon. This would be especially useful in multi-process or multi-path process capable tunnel icons. During the passage, the input object can be transmuted into the output object, so that the transmutation denotes the completion of the process signified by the process capable tunnel icon.

The process capable tunnel icon provides a visual indication to the user that a receptive zone for invoking the process signified by the icon is reached. In addition, several methods are disclosed herein to prevent inadvertent processing of a dragged object. A process capable tunnel icon, where a process is invoked to an object dragged into one of the icon's portals, has a hazard in that an unwary user may inadvertently modify an object being dragged across an electronic desktop shown on the display screen, particularly if the process capable tunnel icon is invisible or poorly visible due to clutter on the electronic desktop.

In accordance with one embodiment of this invention, when an object is dragged to a portal, a feedback force is applied to the user (e.g., a user mass ball) to stop or inhibit further movement of the object on the screen. This indicates to the user that a barrier has been reached, and explicit action is needed in order to activate the process represented by the process capable tunnel icon. The user may exert more force to overcome the barrier, in which case the mouse/pointer moves through the icon with no processing of the object or the user responds with an appropriate action to indicate that processing is to take place.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
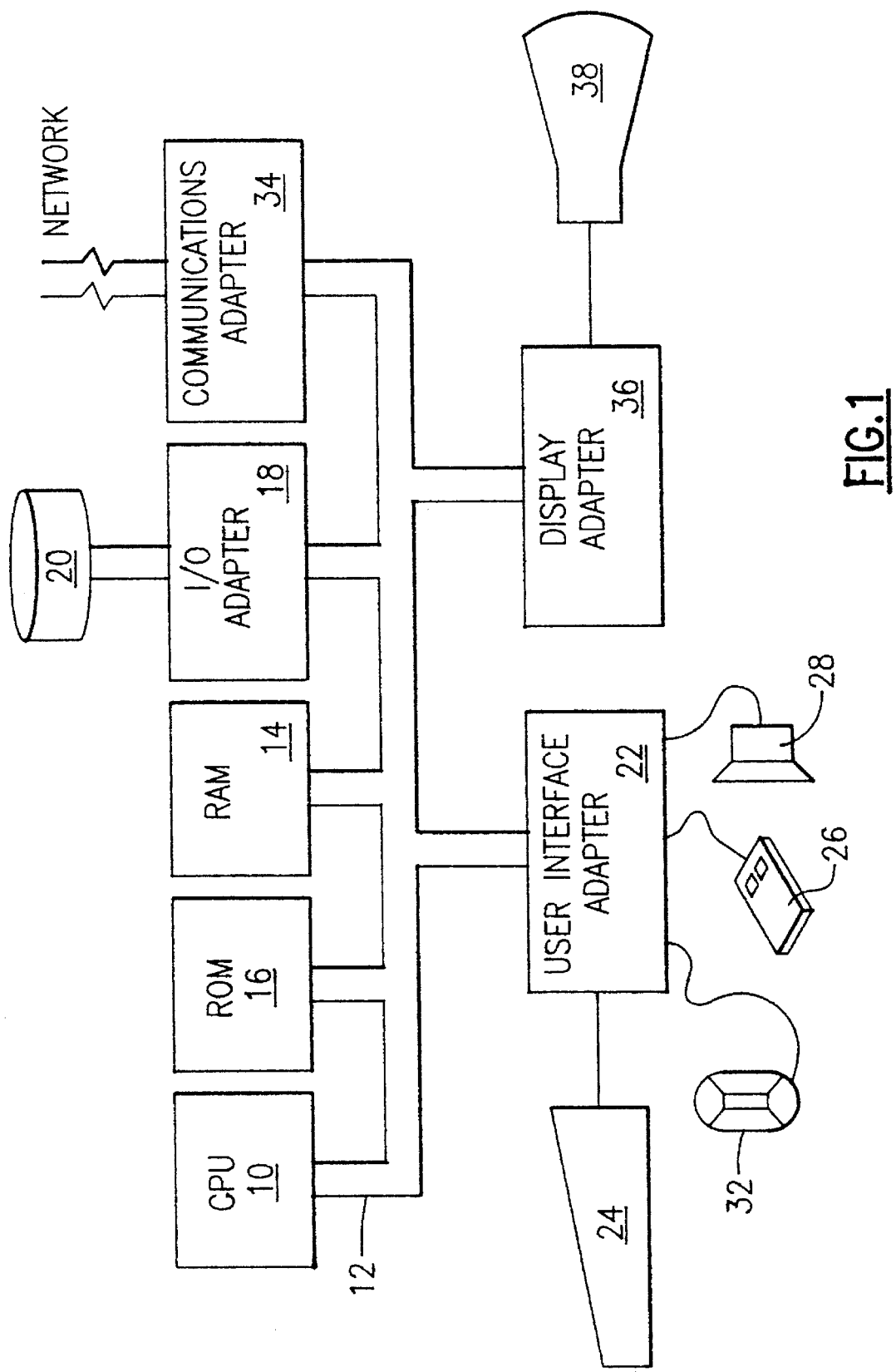
FIG. 1 is a block diagram of an exemplary computer system to implement a graphical user interface with process capable tunnel icons in accordance with the teachings of this invention.

The invention is preferably practiced in a representative hardware environment depicted in FIG. 1, which illustrates a typical hardware configuration of a workstation, having a central processing unit 10, such as a conventional microprocessor, and a number of other units interconnected via a system bus 12. The workstation shown in FIG. 1 includes a Random Access Memory (RAM) 14, Read Only Memory (ROM) 16, an I/O adapter 18 for connecting peripheral devices such as disk units and tape drives 20 to the bus, a user interface adapter 22 for connecting a keyboard 24, a mouse 26, a speaker 28, a microphone 32, and/or other user interface devices such as a touch screen device (not shown) to the bus, a communication adapter 34 for connecting the workstation to a data processing network and a display adapter 36 for connecting the bus to a display device 38.

The subject invention allows a user to invoke an operation by simply dragging a file icon to a tunnel icon representative of an operation and dragging the file icon through the tunnel icon. This action will invoke an operation that transforms the original file associated with the file icon into a converted file associated with a new icon representative of the converted file.

Figure 2:
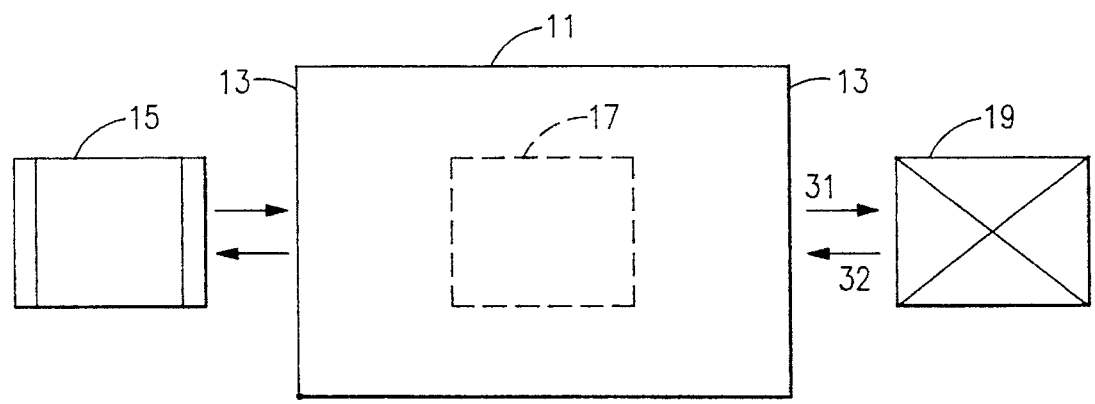
FIG. 2 is a pictorial view of one exemplary embodiment of a single-input, single-output process capable tunnel icon in accordance with the teachings of this invention.

Turning now to our invention in greater detail, FIG. 2 illustrates an embodiment of a single-input single-output (SISO) tunnel icon 11. This tunnel icon has portals 13 on either end. An icon 15 representing a file to be transformed is dragged through a portal 13 and dropped via a mouse or placed there by an audible command (e.g., "process icon") from the user, where it enters a wait state indicated by the dashed box 17. While in this wait state, the icon preferably changes its size and/or coloring, to visually feed back to the user that an operation is pending. This wait state could also be denoted by an audible cue from the computer.

Additionally, arrival at the receptive area of the process capable tunnel icon can be indicated by a visual cue such as, but not limited to, a change in color or pattern of the entry portal of the process capable tunnel icon and/or the entire tunnel icon itself.

The process capable tunnel icon symbolizes completion of processing by either changing the appearance of the processed icon and/or by moving the icon (indicated at 19) to an output portal on the process capable tunnel icon or indicating process completion in some other suitable way. If the file icon is processed, the user can, if appropriate, drag the processed file icon away from the process capable tunnel icon. Preferably, there is a user defined time-delay between when the object file icon enters the tunnel icon and when the process denoted by the tunnel icon takes place. Of course, the user can select the process to proceed without delay. However, a delay allows the user to have second thoughts and drag the object from the jaws of the process about to activate.

If a delay is provided, the icon remains in a wait state in the tunnel icon until either the user gives an "OK-to-process" or a timeout of the delay occurs. This OK-to-process may consist of one or more mouse clicks, a keyboard input, or a verbal OK to a computer with a capability of accepting voice activated inputs.

Once the wait state ends, the file denoted by icon 15 is processed and the transformed file is denoted by icon 19. If this processing takes a measurable amount of time, icon 15 may change in size and/or color again, to indicate that the processing is indeed taking place. Additionally, the beginning of this processing can also be denoted by another audible cue from the computer.

Process flow arrows 31 and 32 indicate the flow of this transformation. This flow may be left-to-right 31, right-to-left 32, or bidirectional 31/32. If bidirectional, the process denoted by the tunnel icon is reversible, i.e., the new item denoted by icon 19 can be retransformed back into the old item denoted by icon 15.

Figure 3:
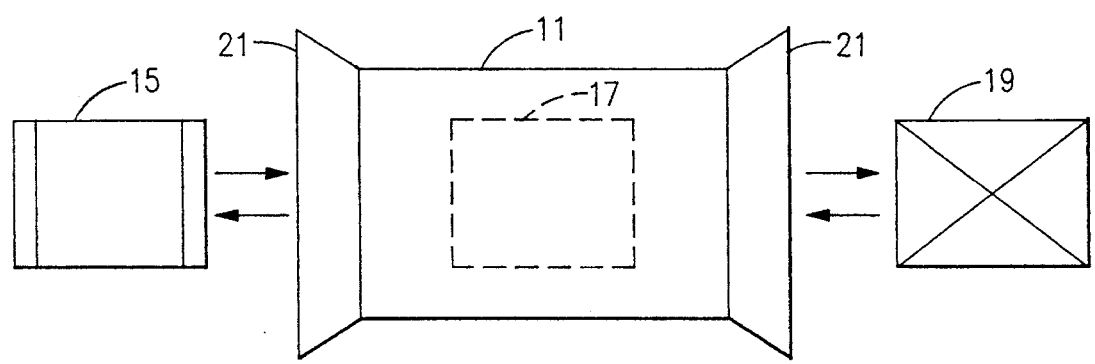
FIG. 3 is a pictorial view, similar to FIG. 2, of a tunnel icon with tunnel portals.

To assist persons who are mobility impaired, FIG. 3 shows the addition of funnels 21 on the tunnel icon 11. These funnels act to guide a user in dragging an icon into a tunnel icon for processing.

Figure 4:
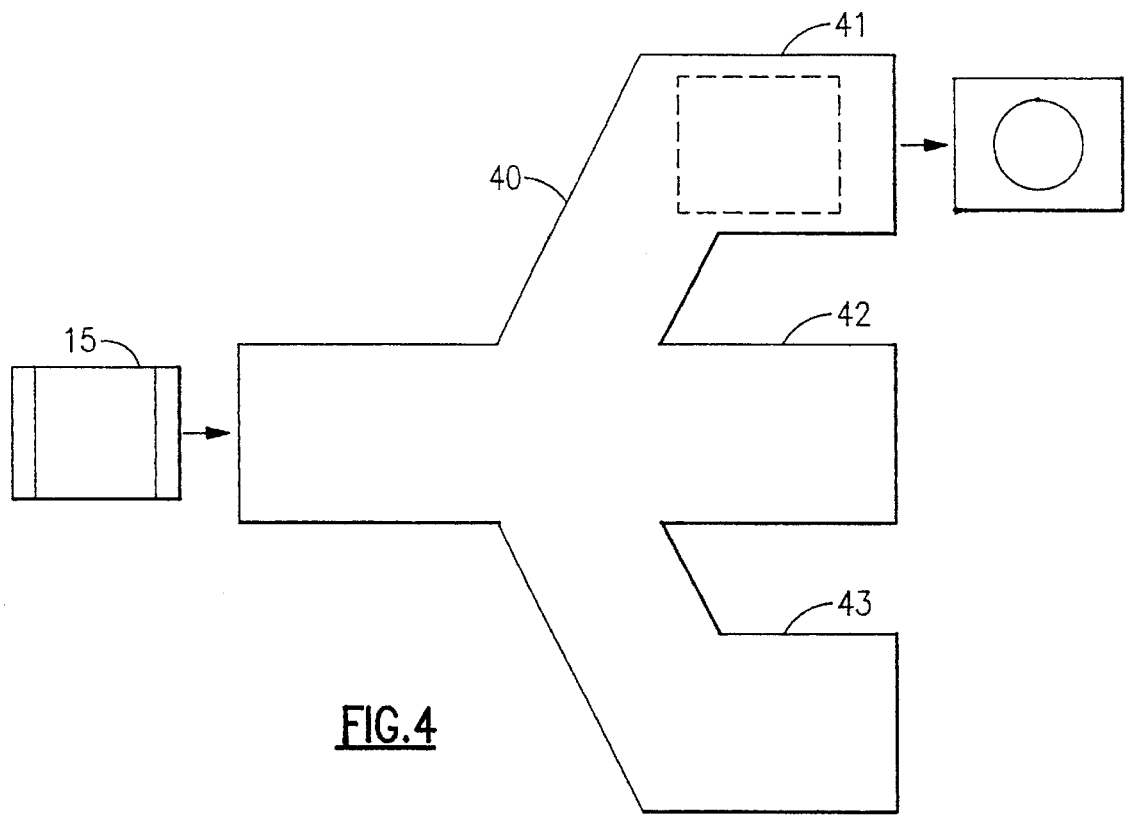
FIG. 4 is a pictorial view of a single-input, multiple-output process capable tunnel icon.

FIG. 4 shows a single-input multiple-output tunnel icon 40. The icon 15 representing a file to be processed is dragged through the tunnel icon 40 to one of a plurality of outputs 41, 42, 43, etc. As in FIGS. 1–3, the icon preferably then enters a wait state as part of the confirmation process. Once a confirmation has been received, the icon is processed. Otherwise the icon is kicked back out of the tunnel if confirmation is not received within the confirmation period. Alternately, the entrant icon could be processed into all outputs 41, 42, 43, etc., as in the case of output to mailing lists.

Figure 5:
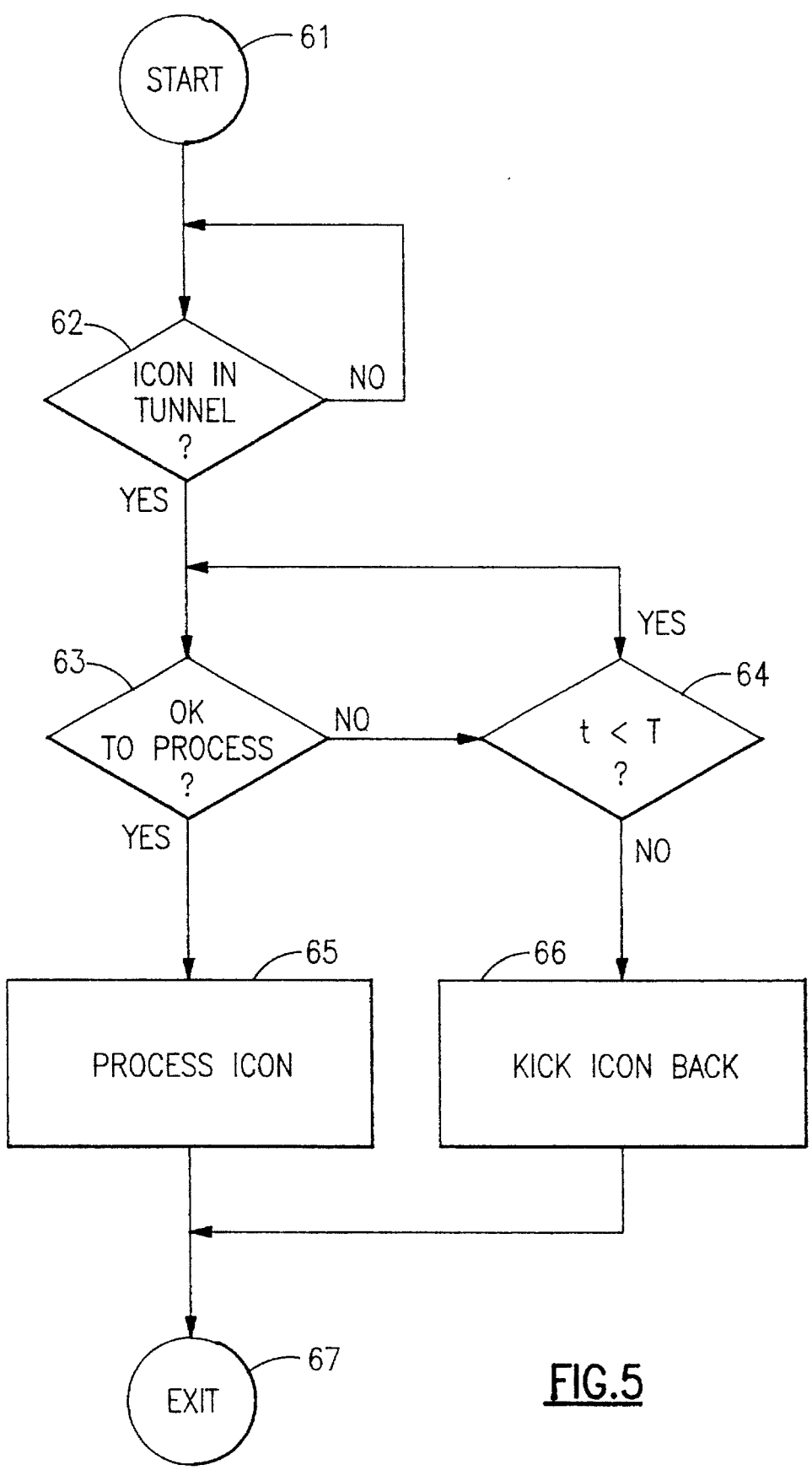
FIG. 5 is a flow diagram of the operation of the tunnel icons of FIGS. 3 and 4.
Figure 7:
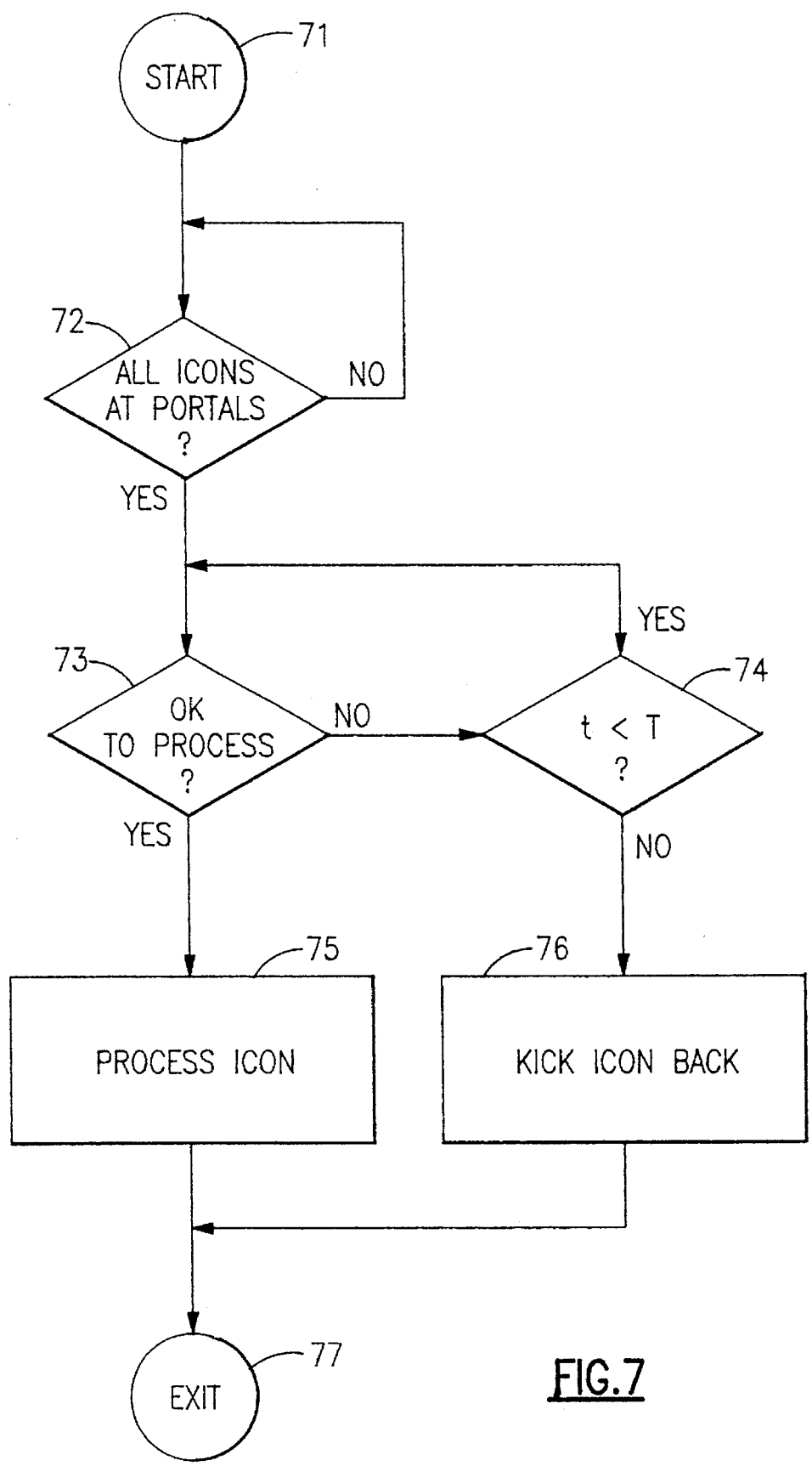
FIG. 7 is a flow diagram of the operation of FIG. 6.

FIG. 5 shows a flow chart of the processing activity associated with FIGS. 2–4. After the start of the algorithm 61, there is a check in block 62 to see if there is a file icon 15 in the tunnel process icon. If there is an icon 15 within the process tunnel icon boundary, a wait state begins, block 64. If the time t that icon 15 is within the tunnel icon is less than a timeout parameter T, and an OK-to-process command is received (block 63), then the icon is processed in step 65 and the algorithm is exited. However, if the icon 15 is waiting for longer than the timeout parameter T and no OK-to-process command is received, then the icon is moved out of the tunnel icon, block 66. During this wait period, the user could always drag the target icon out of the tunnel icon to cancel processing.

Figure 6:
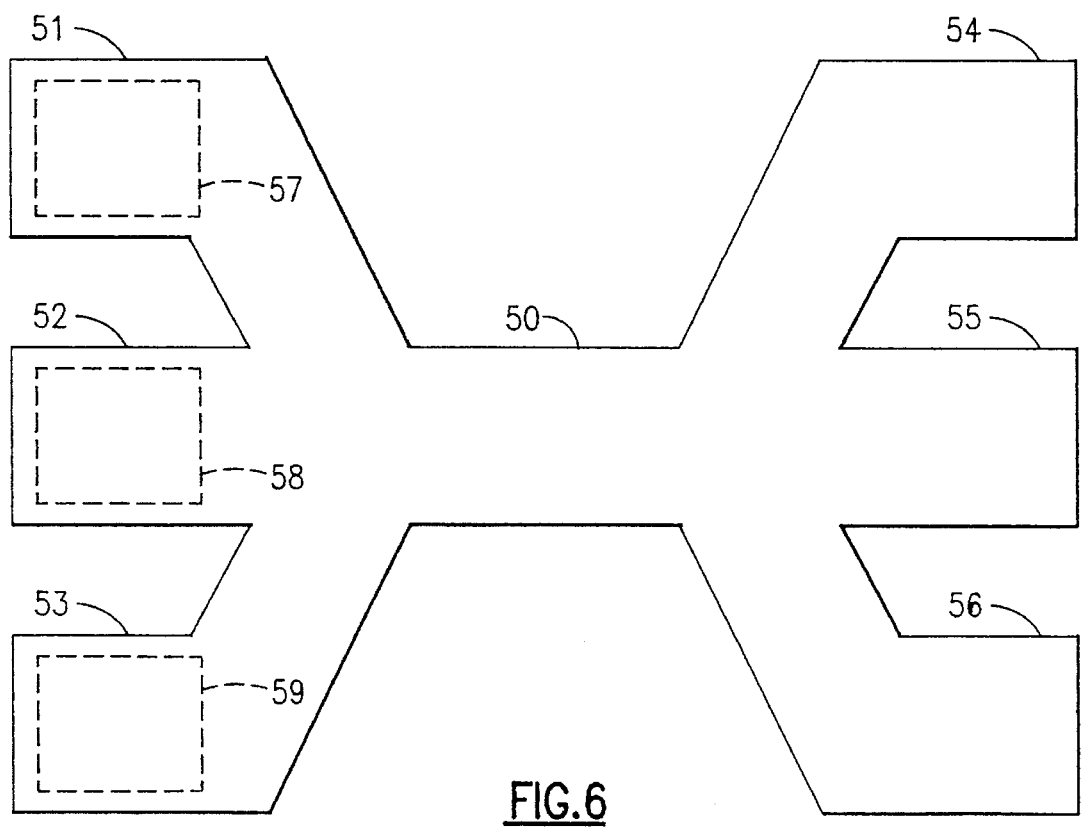
FIG. 6 is a pictorial view of multiple-input, multiple-output process capable icon.

FIG. 6 shows a multiple-input multiple-output tunnel icon 50. FIG. 6 is a visualization of the forking and joining process used in queueing theory. There are a plurality of inputs 51, 52 and 53, as well as a plurality of outputs 54, 55 and 56. The icons 15 to be processed are dragged to the entrance portals 51, 52 and 53. Once all icons 15 have been dragged to their respective entrances, they enter a wait state, indicated here by the dashed boxes 57, 58 and 59, but in practice may have their coloration and/or size changed as desired to indicate their states. Then the group of items represented by the icons at the entrance portals are processed once an OK-to-process is received.

The results of this processing exit from the outlet portals 54, 55 and 56. Note, the number of entrance portals need not equal the number of outlet portals. FIG. 4 is the case where the number of entrance portals equals one. If the number of entrance and exit portals both equal one, then that is FIG. 2. One variant of FIG. 6 is where there are multiple-inputs and a single-output, i.e., a MISO process capable tunnel icon.

Analogous to the flowchart in FIG. 5 for FIGS. 2, 3 and 4, FIG. 7 shows a flowchart applicable to FIG. 6. Once all icons are at the entrance portals, step 72, then a wait state is entered, step 73. This wait state continues until either an OK-to-process is received in step 73 or the wait state times out in step 74. If the OK-to-process is received in time, then the items denoted by the icons at the entrance portals 51, 52 and 53 are processed and exit the MIMO tunnel icon 50 at the exit portals 54, 55 and 56. However, if the wait state times out without any permission to process any icons, then the icons are kicked out of the MIMO tunnel 50 without processing.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A graphical method for a user to execute a computer process command on a computer data file, comprising the steps of:

representing said computer process command on a display screen as a process tunnel icon that has at least two spaced apart portals one of said spaced apart portals graphically defining an entrance into said process tunnel icon and another of said spaced apart portals graphically defining an exit from said process tunnel icon;

representing said computer data file on said display screen as a file icon;

dragging said file icon into said process tunnel icon through said one of said spaced apart portals defining an entrance;

executing said computer process command on said computer data file when said file icon is within said process tunnel icon;

removing said file icon from said tunnel icon via said another of said spaced apart portals defining an exit;

transforming the appearance of said file icon removed from said tunnel icon in said removing step to provide a visual feedback to said user of said execution step.

2. The graphical method for a user to execute a computer process command on a computer data file as in claim 1 including the further step of delaying said execution step for a predetermined interval after said dragging step is completed.

3. The graphical method for a user to execute a computer process command on a computer data file as in claim 1 including the further step of commencing said execution step in response to a process execution command from said user.

4. The graphical method for a user to execute a computer process command on a computer data file as in claim 2 including the further step of commencing said execution step in response to a process execution command from said user.

5. The graphical method for a user to execute a computer process command on a computer data file as in claim 1 wherein said portals are flared outwardly to facilitate said dragging step.

6. The graphical method for a user to execute a computer process command on a computer data file as in claim 1 wherein said computer process command represented by said process tunnel icon is a reversible process and the direction of said reversible process is determined by the portal through which said file icon is dragged in said dragging step.

7. The graphical method for a user to execute a computer process command on a computer data file as in claim 1 wherein said process tunnel icon has an input portal and a plurality of output portals.

* * * * *